United States Patent [19]
Pastore et al.

[11] Patent Number: 5,948,508
[45] Date of Patent: Sep. 7, 1999

[54] ON-LINE PAINTABLE INSERT

[75] Inventors: Luigi Pastore, Korschenbroich; Georg Feichtmeier, Rommerskirchen, both of Germany

[73] Assignee: 3M Innovative Properties Company, St. Paul, Minn.

[21] Appl. No.: 08/911,743

[22] Filed: Aug. 15, 1997

[51] Int. Cl.$^6$ ....................................................... B32B 3/00
[52] U.S. Cl. ............................ 428/156; 428/31; 428/159; 428/161; 428/162; 428/165; 428/173; 428/545; 526/273; 526/328.5; 522/100
[58] Field of Search .............................. 428/545, 31, 156, 428/159, 161, 162, 165, 173; 296/901; 526/273, 328.5; 522/170, 100

[56] References Cited

FOREIGN PATENT DOCUMENTS

9419781 2/1995 Germany .
7-246889 9/1995 Japan .

*Primary Examiner*—Timothy Speer
*Assistant Examiner*—Abraham Bahta
*Attorney, Agent, or Firm*—Harold C. Knecht III

[57] ABSTRACT

An on-line paintable insert useful for being mounted into a depression having a lateral, a longitudinal and a vertical extension, said insert comprising an optionally shaped body having a paintable surface and being attachable to the depression by an adhesive layer. The lateral extension of a bottom area of the body is essentially equal to or exceeds the minimum lateral extension of the depression over the longitudinal extension of the depression, and the body is deformable at least in the outer parts of the bottom area to allow for essentially self-centering and friction-fitting mounting of the insert into the depression. The lateral extension of an upper area of the body is less than the lateral extension of the depression at the vertical position of the upper area of the body when mounted into the depression, over the longitudinal extension of the depression which results in a gap between the upper area including the paintable surface, and the depression. The insert is essentially dimensionally stable when subjected to a painting cycle.

20 Claims, 5 Drawing Sheets

ON-LINE PAINTABLE INSERT

BACKGROUND OF THE INVENTION

1. Field of the Invention

The present invention refers to an on-line paintable insert useful for mounting into a depression having a lateral, a longitudinal and a vertical extension whereby the insert comprises an optionally shaped body having a paintable surface and being attachable to the depression by an adhesive layer. The invention also refers to the use of such inserts in the automobile industry and, in particular, to their use as paintable roof-ditch inserts.

2. Description of the Related Art

Paintable inserts for depressions are useful for various industrial applications and, in particular, in the automobile industry. An example of an essentially channel-shaped depression found in an automobile body is the roof-ditch which is formed at the junction of the roof panel and the side panel and which extends over the automobile roof in the longitudinal direction.

For styling and reducing drag it is desirable to fill the roof-ditch with, for example, an insert that can be easily installed, exhibits an aesthetic surface, and compensates for dimensional variations in the ditch itself.

Figure 1:
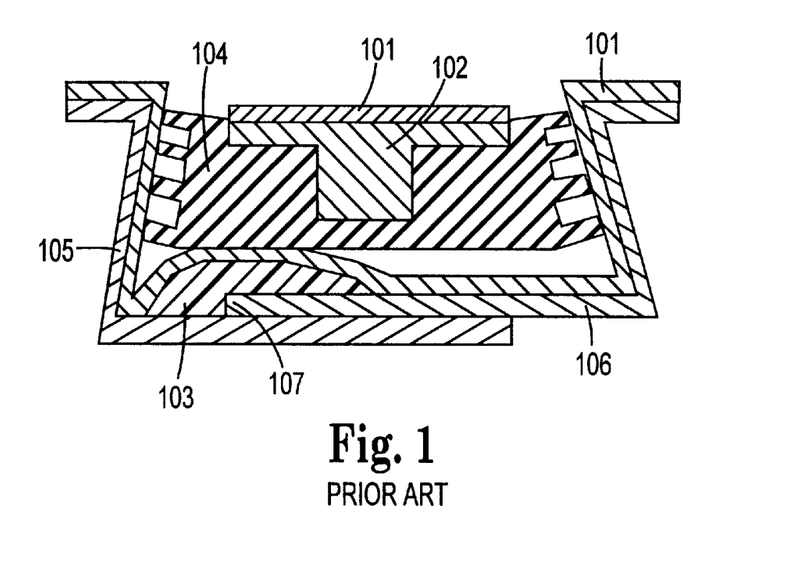
FIG. 1 is a schematic cross-sectional view of a roof-ditch channel comprising an off-line painted insert of the prior art, having a metal molding 102 and a gap closing rubber profile 104.
Figure 2:
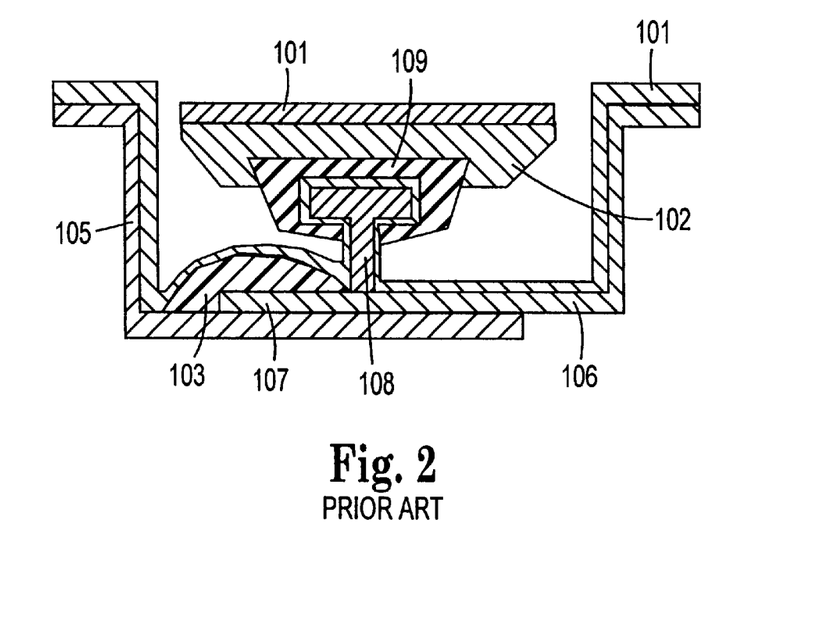
FIG. 2 is a schematic cross-sectional view of a roof-ditch channel comprising an off-line painted insert of the prior art, having a metal molding 102 and a mechanical fastening means 109 engagable with a T-shaped hook mechanical fastening means 108 which is attached, for example, to the side panel 106 of the roof-ditch molding.

FIGS. 1–2 show roof-ditch insert constructions of the prior art.

FIG. 1 shows a schematic cross-sectional view of a roof-ditch channel. The junction 107 between the roof panel 105 and the side panel 106 is sealed with a sealing layer 103. After application of the sealing layer 103, the automobile body including the roof-ditch channel is subjected to the automobile painting cycle resulting in a continuous paint layer 101. The roof-ditch insert comprising an off-line painted metal molding 102 and a gap closing rubber profile 104 is then friction-fitted into the roof-ditch channel.

An off-line paintable insert similar to that of FIG. 1 is described in Research Disclosure, Apr. 1992, p. 291, no. 336, 79. The co-extruded molding has a color-film portion, a metal stiffener, and a pliable polyvinyl chloride (PVC) portion. The molding is placed in the ditch and forced into it by means of a roller, the pliable PVC portion securing the molding in the ditch and compensating for variations in the lateral extension (i.e., the width) of the ditch over the length of the roof.

FIG. 2 shows a schematic cross-sectional view of another off-line paintable insert of the prior art. A T-shaped fastening means 108 is applied to the side panel 106 of the roof-ditch channel, for example, and acts as a mechanical fastening means for the roof-ditch molding comprising an off-line painted metal molding 102 and a fastening means 109 engagable with the T-shaped hook fastening means 108.

Off-line paintable roof-ditch moldings have several disadvantages. Since the roof-ditch molding and the car body are painted in separated steps, the colors often do not fully match so that the aesthetic appearance of off-line painted inserts is not fully satisfying. Moreover, roof-ditch inserts in a great variety of colors have to be stored and supplied to the point of manufacture which is demanding from a logistics point of view.

Because of the principle problems associated with off-line paintable constructions there has been a strong demand for on-line paintable roof-ditch inserts for some time. The prior art construction shown in FIG. 3 has been suggested as an on-line paintable cap for essentially planar metal seams 111 formed at the junction of two metal parts 112 and 113. The cap comprises a metal molding 102 and a flexible sealer mass 103 which can be bent along the incision 110 to be mechanically secured to the metal molding 102. The sealer mass seals the metal seam 111 and adheres the cap to the metal substrates.

Figure 3:
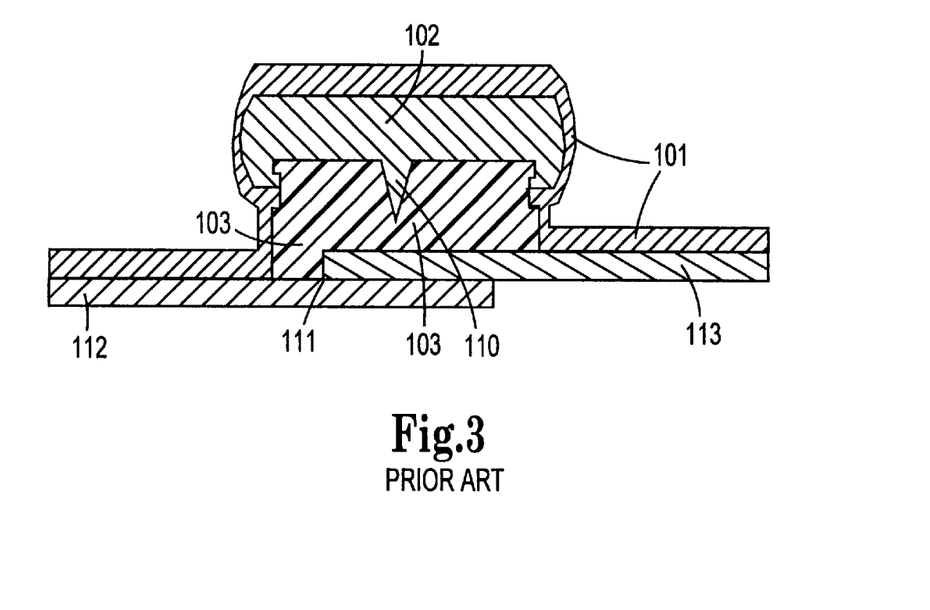
FIG. 3 is a schematic cross-sectional view of an on-line paintable cap of the prior art having a metal molding 102 and a flexible sealer mass 103 secured to the metal molding, which seals the metal seam 111 and adheres the cap to the metal substrates.

The cap of FIG. 3 is not suited for being inserted into depressions such as roof-ditch channels. The lateral extension of the metal molding 102 is smaller than the minimum width of the roof-ditch channel over its length so that no self-centering is obtained. If the lateral extension of the metal molding 102 were adjusted to the minimum width of the roof-ditch channel over its length, this might result in galvanic corrosion problems and would, in particular, be less appealing from an aesthetic point of view because an air gap between the metal molding 102 and the edge of the roof-ditch channel would be present over part of the length of the roof-ditch channel only. The protruding metal molding 102 also prevents the bottom part of the roof-ditch channel from being painted which results in corrosion problems.

It was therefore an objective of the present invention to provide an insert useful for mounting into a depression and, in particular, into the roof-ditch channel of an automobile, said insert:

being on-line paintable, providing a high quality class A-type surface after the painting cycle, which is aesthetically satisfactory;

being essentially self-centering, i.e., able, for example, to manage optional tolerances in the width (lateral extension) and depth (vertical extension) over the length (longitudinal extension) of the depression; and being capable of being secured to the depression in a way so that the painting layer, applied to the inner surface of the depression during the painting cycle, reliably protects the depression against corrosion.

It was another objective of the present invention to provide an on-line paintable insert usefull for mounting into a depression and, in particular, into the roof-ditch channel of an automobile, which does not have the shortcomings of the state-of-the-art constructions or has them only to a lower degree. Other objectives of the present invention can be readily taken from the following detailed specification.

SUMMARY OF THE INVENTION

The invention refers to an on-line paintable insert useful for mounting into a depression having a lateral, a longitudinal and a vertical extension, said insert comprising an optionally shaped body having a paintable surface and being attachable to the depression by an adhesive layer. The lateral extension of the bottom area of the body is essentially equal to or exceeds the minimum lateral extension of the bottom of the depression over the longitudinal extension of the depression, the body being deformable at least in the outer parts of the bottom area to allow for essentially self-centering and/or friction-fitting mounting of the insert into the depression.

The lateral extension of the upper area of the body is less than the lateral extension of the depression at the vertical position of the upper area of the body when being mounted into the depression, which results in a gap between the upper area including the paintable surface, and the depression such as, for example, the roof-ditch channel.

The insert is essentially dimensionally stable when subjected to a painting cycle.

The present invention furthermore refers to the use of the on-line paintable insert according to the invention in the automobile industry and, in particular, to its use as an on-line paintable roof-ditch insert.

BRIEF DESCRIPTION OF THE DRAWINGS

FIG. 4 is a cross-sectional view along the line 4—4 in FIG. 5.

FIG. 7 shows the cross-sectional view along the line 7—7.

FIG. 9 shows the cross-sectional view along the line 9—9.

DETAILED DESCRIPTION OF THE PREFERRED EMBODIMENTS

The on-line paintable insert 1 of the present invention is useful for mounting into a depression 2 having a width (lateral extension), a depth (vertical extension), and a length (longitudinal extension). The depression 2 may be of any shape with channel-type depressions being preferred, the length of said channel-type depression 2 exceeding each of its depth and width by a factor of at least 2 and, more preferably, of 3 or more. The ratio of the longitudinal extension of the depression 2 over its lateral extension preferably is at least 5. The cross-section of the depression along the longitudinal direction preferably is not undercut or is undercut to a low degree only whereby the ratio of the maximum lateral extension of the depression 2 along the vertical direction over the lateral extension of the depression 2 at its top is preferably less than 1.5, and more preferably not more than 1.3.

An example of such a depression 2 is the roof-ditch channel 10 of automobiles which is formed on the car roof at the junction 13 of the roof panel 11 and the side panel 12. The roof-ditch typically extends over the length of the roof and may have a slightly curved shape. The roof-ditch often exhibits an essentially rectangular cross-section along the longitudinal direction but trapezoidal or other cross-sections are also possible. The width of most roof-ditch channels of commercially available cars may vary over a broad range and is typically between 18–25 mm, more preferably between 10–20 mm. The width of the roof-ditch channel along the longitudinal direction is typically not uniform. Assuming, as a typical example, the nominal width of the roof-ditch channel to be 14 mm, the actual width may typically vary, for example, from 12–16 mm.

The depth of the roof-ditch channel has so far been typically between 8 and 30 mm in order to allow for insertion of the relatively voluminous prior art constructions of FIGS. 1 and 2, for example. The insert 1 according to the present invention can be used for a broader range of roof-ditch channel depths of from about 2 mm or more and, more preferably, between about 3–30 mm. The roof-ditch channel is typically spot-welded at the junction 13 of the roof panel 11 and the side panel 12, and there are usually several welding points along the longitudinal extension of the roof-ditch channel 10 resulting in an undulating shape of the roof-ditch bottom sometimes also referred to as the pillowing effect. The depth of the roof-ditch channel varies along the lateral extension of the roof-ditch channel mainly because of the step at the junction 13, because of the pillowing effect, and because of the impressions at the spot welding points, resulting in a total variation of, for example, ±2 mm from the average depth along the lateral extension and of about ±1.5 mm from the average depth along the longitudinal extension of the roof ditch channel.

An optionally shaped body 3 is inserted into the depression 2 whereby it is essential that the dimensions of the body 3 are selected to allow for essential self-centering and/or friction-fitting mounting of the insert 1 into the depression 2. This requires that the bottom area 7 of the body 3 be essentially equal to or exceed the minimum lateral extension of the bottom of the depression 2 over the longitudinal extension of the depression 2. The term "bottom area" denotes the lower part of the body 3, the outer parts 16 of which preferably project past the other parts of the body 3 in order to secure and center the body 3 in the depression 2. The optionally shaped body 3 which preferably is a molding and/or comprises molded parts, preferably exhibits distinctly smaller tolerances in width, length and depth as compared to, for example, a roof-ditch channel 10. The dimensions of the body 3 can typically be regarded as constant in comparison to the dimensions of, for example, a roof-ditch channel.

Figure 4:
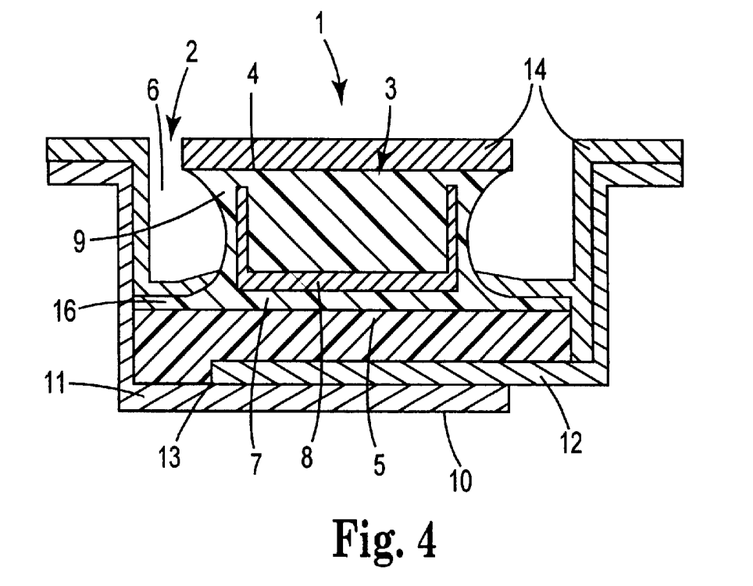
FIG. 4 is a schematic cross-sectional view of a roof-ditch channel comprising an on-line painted insert 1 according to the invention comprising an essentially anvil-shaped body 3 having a bottom area 7 with outer parts 16 and an upper area 9, a stiffening inlay 8, and a surface 4 (with paint 14) separated from the roof-ditch channel by the gap 6, said insert being adhered to the bottom of the roof-ditch channel with adhesive layer 5 which covers the junction 13 between the roof panel 11 and the side panel 12 of the automobile.

FIG. 4 shows a schematic cross-sectional view of a preferred embodiment of an insert 1 according to the invention inserted into the roof-ditch channel 10 of an automobile. A schematic representation of the part of the roof-ditch channel 10 formed at the junction of the roof panel 11 and the body panel 12, is shown in the top view of FIG. 5. The cross-sectional view of FIG. 4 was taken along the line 4—4 in FIG. 5.

The insert of FIG. 4 comprises an essentially anvil-shaped body 3 which is adhered to the bottom of the roof-ditch channel with the adhesive layer 5. The body 3 comprises a bottom area 7 with protruding outer parts 16, the lateral extension of the bottom area 7 of the body 3 being essentially equal to or exceeding the minimum lateral extension of the bottom of the roof-ditch channel over the length of the roof-ditch channel. The tolerance of a roof-ditch channel is schematically shown to an exaggerated degree in the top view FIG. 5. Selecting the dimensions of the optionally shaped body 3 and, in particular, of its bottom area 7 and the outer parts 16 of the bottom area 7 as indicated above, results in self-centering and/or friction-fitting the insert between the innermost points 19 and 20 along the edges of the roof-ditch channel. The self-centering improves in proportion to the number of points 19 and 20 present along the longitudinal extension of the depression. The self-centering effect is also supported by points being slightly more outside than points 19 and 20 but separated from these points by only up to about 0.30 mm and, in particular, about 0.15 mm or less. An aesthetically appealing self-centering preferably requires at least one point 19 and at least one point 20 along the length of the roof-ditch channel 10. More preferably, the average number of points 19, 20 and/or the more outside but closely adjacent points per cm along the longitudinal extension is 3–4/m. It was found by the present inventors that the concentration of such points in roof-ditch channels of commercially available automobiles is high enough to allow in all cases for an aesthetically highly pleasing self-centering effect.

It is essential that the exposed parts of the roof-ditch channel are fully painted during the painting cycle in order to prevent corrosion and result in a paint layer 14 that provides an aesthetically appealing appearance. This is obtained when using the insert 1 according to the invention because self-centering and/or friction-fitting mounting of the insert is effected by the outer parts 16 of the bottom area 7 of the body 3.

The lateral extension of the upper area 9 of the body 3 is chosen so that a gap 6 results between the edge of the roof-ditch channel and the upper area 9 of the shaped body 3. The term "upper area" 9 denotes the upper part of the body 3 which is bordered on one side by the paintable surface 4. The thickness of the upper area 9 (as measured in the vertical direction) preferably comprises between 5–30% of the thickness of the body 3.

Figure 5:
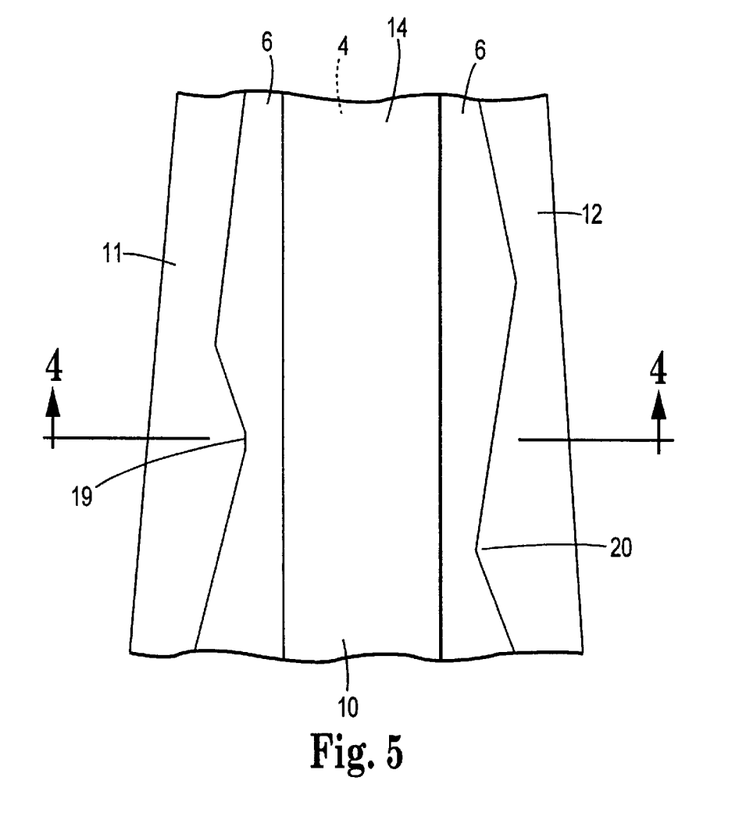
FIG. 5 is a top view of a roof-ditch channel comprising an on-line painted insert 1 according to FIG. 4. The top view of FIG. 5 shows the gap 6 between the painted area 14 and the roof panel 11 and the side panel 12, respectively.

The gap 6 is required over the whole longitudinal extension of the shaped body 3 as can be taken from FIG. 5. The lateral extension of the upper area 9 of the body is chosen to provide a gap 6 which is sufficiently broad over the whole longitudinal extension of the insert to reliably prevent the formation of paint bridges between the paintable surface 4 of the body 3 and the edge of the roof panel and the side panel, respectively, on subjecting the depression 2 containing the insert 1 to the painting cycle. The width of the gap 6 typically varies over the longitudinal extension of the insert 1 as is schematically shown to an exaggerated degree for a roof-ditch channel in FIG. 5. The minimum width of the gap 6 is preferably selected depending on the depth of the roof-ditch channel and is preferably chosen so that the exposed parts of the roof-ditch channel 10 and the inserted body 3 are painted during the painting cycle. The minimum width of gap 6 is preferably selected to be the broader the deeper the roof channel, and is, for example, preferably selected to be 2–4 mm for a roof-ditch channel with an average depth (as measured from the spot-welded line) of 6–10 mm. The minimum width of the gap 6 can furthermore be selected to be smaller when the tolerances of the depression 2 are smaller.

The insert 1 of the embodiment of FIG. 4 exhibits in the middle part between the outer parts 16 of the bottom area 7 and the upper area 9 a concave curvature which is preferred in order to ensure that the exposed parts of the bottom area of the body 3 are fully painted during the painting cycle.

Figure 6:
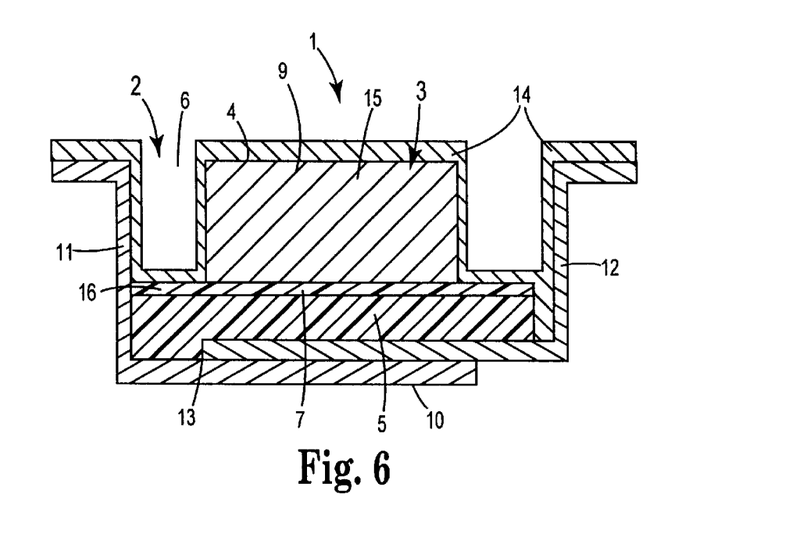
FIG. 6 is a schematic cross-sectional view of a roof-ditch channel comprising another embodiment of an on-line painted insert 1 according to the present invention comprising an essentially rectangularly shaped body 3.

The body 3 is deformable at least in the outer parts 16 of the bottom area 7 to allow for essentially self-centering and/or friction-fitting mounting of the insert 1 into the depression 2. The body 3 may essentially consist of such deformable material as is shown in the embodiment of FIG. 4 or it may comprise different materials as is shown in the embodiment of FIG. 6. The term "outer parts of the bottom area" denotes the outer parts 16 of the bottom area 7 which preferably laterally project past the other parts of the body 3 and essentially secure and/or center the body to the depression 2.

In case the body 3 essentially consists of a deformable material, it preferably additionally comprises a stiffening inlay 8 which may comprise, for example, a metal or a rigid plastic material. A possible design of a stiffening inlay 8 is shown in FIG. 4 but other constructions are also possible and the stiffening inlay 8 may have other geometric shapes. The stiffening inlay 8 is preferably selected to impart sufficient stiffness to the body 3 to avoid transferring the undulated shape of the bottom of the roof-ditch channel to the paintable surface 4 of the body 3 which results in an aesthetically less appealing appearance of the painted roof ditch insert. The stiffening inlay's effects are most advantageous when the roof-ditch insert 1 is mainly supported by some elevated portions on the bottom of the roof-ditch channel such as, for example, welding spots that prevent the insert 1 from fully conforming to the shape of the bottom of the roof-ditch channel.

FIG. 6 shows a shaped body 3 comprising an upper part 15 such as, for example, a metal molding, and a layer of a deformable material attached to it, forming the bottom layer 7 of the body and imparting deformability to the outer parts 16 of the bottom area 7 of the body 3. In this embodiment the metal molding 15 imparts a sufficiently high stiffness to the body 3, that no additional stiffening inlay 8 is required to suppress the pillowing effect. The metal molding 15 is preferably shaped in a way to ensure that it is fully painted during the painting cycle in order to prevent corrosion. Reference numeral 14 designates the paint layer.

The optionally shaped body is preferably obtained by molding.

The material used in the typically protruding outer parts 16 of the body 3 is selected together with the dimensions, in particular with the thickness (vertical extension) and the width (lateral extension) of the outer parts 16 to allow for essentially self-centering and/or friction-fitting mounting of the insert 1 into the depression 2. Friction-fitting preferably reliably secures the insert 1 to the depression 2, in particular without grazing the inner surface of the depression 2 which might result in corrosion problems. It was found by the present inventors that the materials used in the deformable, typically protruding outer parts 16 of the bottom area 7 are preferably selected together with the dimensions of the outer parts 16 to impart a Taber stiffness as measured according to TAPPI (Technical Association of Paper and Pulp Industry) T 489-M-60 using a deformation angle of 15°, of between 5 and 50 g.cm and, more preferably, of between 10 and 40 g.cm to the outer parts 16 of the bottom area 7.

The shape and dimension of the bottom area 7 and, in particular, of its preferably protruding outer parts 16 are preferably selected for a specific material in order to allow for forcing the insert 1 into the respective depression 2 by positioning the insert onto the depression 2 and rolling it over twice with a rubber roller of 5 kg or less.

The material used in the bottom area 7 and its outer parts is furthermore preferably selected to be compatible with the painting cycle comprising one or more painting steps. This means that the material used in the bottom area 7 with its outer parts 16 as well as the material used for the other portions of the shaped body 3 exhibits a sufficient thermal stability with respect to the temperature-time profile of the respective painting cycle. The material used in the bottom area 7 furthermore has to be essentially dimensionally stable when being subjected to the painting cycle in order to reliably secure the self-centered insert 1 to the depression 2 at least until the insert 1 is finally adhered to the depression by means of adhesive layer 5.

The materials useful for the bottom area 7 are preferably selected from a group of polymeric materials comprising polyesters, fluoropolymers, polysulfones, polyaramides, polyimides, polybenzimidazoles, and suitable blends of these polymers with other polymers such as, for example, polyester/acrylate blends and polyester/polycarbonate blends. It is also possible to use elastic sheet metals such as, for example, spring steel sheets for the bottom area 7 although the use of metals is usually less preferred because it may result in corrosion problems. The person skilled in the art can easily screen appropriate materials by checking their melt and/or decomposition temperatures and evaluating their Taber stiffness values as indicated above. An especially preferred material is "POCAN 7916" which is a rubber modified polybutylene terephthalate/polycarbonate blend commercially available from Bayer AG, Leverkusen, Germany.

The dimensions of the insert 1 comprising the body 3 with its upper area 9 and bottom area 7 including the outer parts 16 of the bottom area 7, may vary over a broad range depending on the dimensions of the depression. In case of a typical roof-ditch channel 10, the thickness of the bottom layer 7 (as measured along the vertical direction) and, in particular, of its outer parts 16 preferably is between 100 $\mu$m and 3 mm and, more preferably, between 150 $\mu$m and 2 mm, and the width (lateral extension) of the outer parts 16 typically is between 1 and 3 mm.

The body 3 comprises a material which is dimensionally stable when being subjected to the painting cycle and offers a smooth, paintable surface 4.

In a preferred embodiment of the on-line paintable insert 1 according to the invention the body 3 and the bottom area 7 with its outer parts 16 may comprise the same material. In the embodiment of FIG. 4 the body 3 additionally comprises a stiffening inlay 8 in order to avoid transfer of any irregularities of the bottom of the depression 2 to the paintable surface 4. In an especially preferred embodiment the area 7 with its outer parts 16 and the other parts of the body 3 comprise POCAN 7916, and the body furthermore comprises a stiffing inlay comprising a metal such as, for example, aluminum, steel or brass.

In another preferred embodiment of the on-line paintable insert 1 according to the invention the bottom area 7 with its outer parts 16 and the other portions of the body 3 comprise different materials. In the embodiment of FIG. 6 the bottom area 7 is adhered to the upper part (metal molding) 15 of the body which may be, for example, a molding comprising a metal such as aluminum, steel, copper or brass or an essentially stiff polymer such as, for example, glass fiber reinforced plastics. The bottom area 7 may comprise different or the same materials in its outer areas 16 and the other parts of the bottom area 7 but preferably the same materials are used. The bottom area 7 may be mechanically adhered to the upper part or metal molding 15 or, more preferably, with a pressure-sensitive adhesive, preferably one having a high overlap shear strength of preferably at least 1 N/mm$^2$. Useful adhesives comprise, for example, 3M™ Acrylic Foam Tapes 5314, 5386, 4225 or 4210 which are commercially available from 3M Company, St. Paul, Minn., U.S.A.; structural adhesives such as, for example, epoxide adhesives or adhesives comprising a blend of epoxide resin with a polyester or an acrylate such as the adhesives, described, for example, in U.S. Pat. No. 5,086,088, U.S. Pat. No. 5,310,840, European Patent Publication No. 0,620,259 or International Patent Publication No. WO 95/13,328.

The upper part 15 of the body 3 of the embodiment of FIG. 6 has an essentially rectangular cross-section but other cross-sections like, for example, the anvil-shaped cross-section of the body 3 of FIG. 4, are also possible. In case the upper part 15 is a metal molding, it may be solid but preferably comprises one or more cavities in order to save cost and weight.

The body 3 is adhered to the body of the depression 2 by an adhesive layer 5. The adhesive is selected to reliably secure the body 3 to the deppression and, in particular in case of a roof ditch molding, to additionally seal the junction 13 between the roof panel 11 and the side panel 12.

The adhesive layer 5 may be selected from a group of adhesives comprising, for example, thermosettable adhesives, hot-melt adhesives and pumpable plastisol adhesives. Especially preferred are melt-flowable adhesives which are solid at room temperature and can be inserted into the depression 2, for example, as a strip or a die-cut part. The adhesive is temperature activated during the painting cycle and mass flows upon melting thereby conforming to the bottom of the depression 2 and in case of a roof-ditch channel 10, for example, sealing the junction 13. Melt-flowable adhesives which are useful in the present invention are described, for example, in European Patent Application 96 105 122.4 filed by the present applicant, and the following International Patent Publications: WO 93/23,487, WO 95/13,327, WO 95/13,315, WO 94/21,741, WO 96/10,059 or WO 96/32,453. Preferred melt-flowable adhesives are commercially available from 3M Company, St. Paul, Minn., U.S.A.

The insert 1 according to the present invention can be mounted into depressions 2 of various geometries and it is, in particular, suited for incorporation into roof-ditch channels 10. The insert 1 is:

self-centering and able to manage fabrication tolerances of the depression 2 and, in particular, of roof-ditch channels.

The invention provides criteria for selecting appropriate materials for the bottom area 7 and, in particular, for the outer parts 16 of the bottom area 7, as well as for the other portions of the body 3. The material of the bottom area 7 allows friction-fitting mounting of the insert 1 into the depression 2 and together with the adhesive layer 5 reliably secures the insert to the depression.

The materials useful for the other portions of the body 3 provide an essentially dimensionally stable, temperature resistant profile and a smooth paintable surface 4.

The insert 1 of the present invention can be easily applied and provides an aesthetically highly appealing surface after the painting cycle. Since the tolerance managing and self-centering properties of the insert 1 result from its mechanical construction, the system is extremely reliable and meets the demanding standards of the automotive industry.

Figure 7:
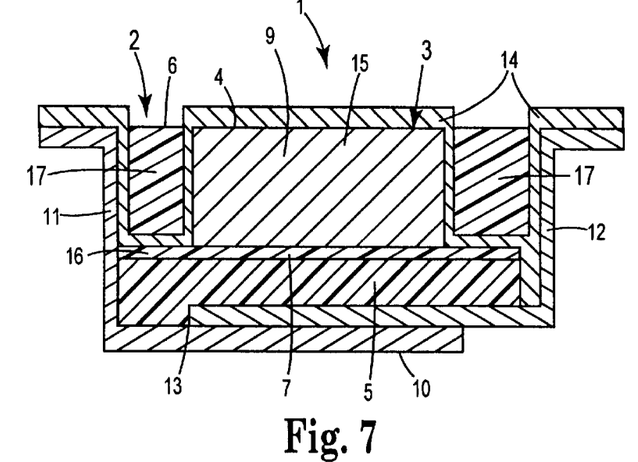
FIG. 7 is a schematic cross-sectional view of a roof-ditch channel comprising the insert 1 of FIG. 6 and additionally comprising a gap closing profile 17 applied after the painting step.
Figure 8:
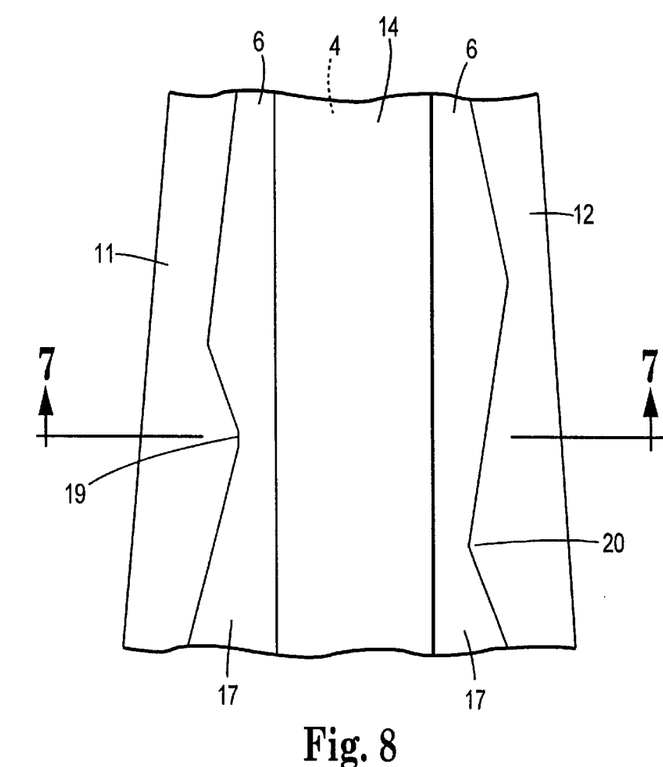
FIG. 8 is a partial top view of a roof-ditch channel comprising an on-line painted insert 1 according to FIG. 7.

The inserts 1 and the specific embodiments described above are given by way of example only, and various modifications are possible. In the embodiment of FIG. 7 a gap closing profile 17 was inserted between the side walls of the roof-ditch channel and the body 3 subsequent to the painting step. The gap closing profile may comprise, for example, rubber or other elastomeric materials. A top view of the roof-ditch channel with the insert 1 of FIG. 7 and the gap closing 17 profile being inserted is shown in FIG. 8. The central surface 4 with paint 14 is limited on both sides by two small strips exposing the color of the gap closing profile. The two strips vary slightly in width which is due to the tolerances of the roof-ditch channel. The construction provides an aesthetically appealing appearance and may be especially attractive for sportive cars.

Figure 9:
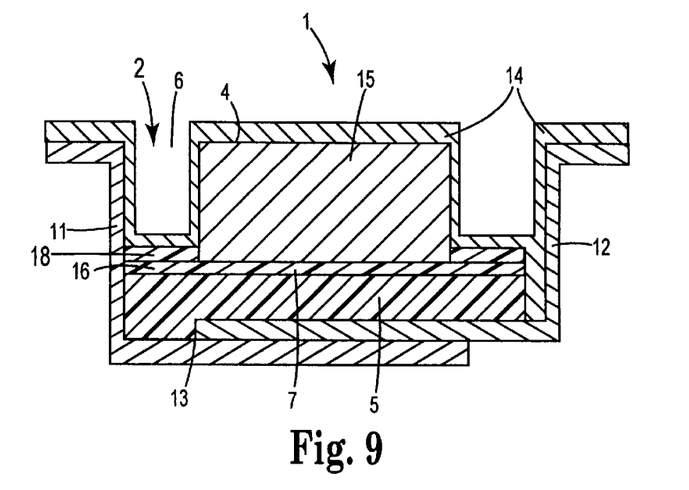
FIG. 9 is a schematic cross-sectional view of a roof-ditch channel comprising another embodiment of an on-line painted insert 1 according to the present invention exhibiting a release liner 18 covering the bottom area 7 of the body 3.
Figure 10:
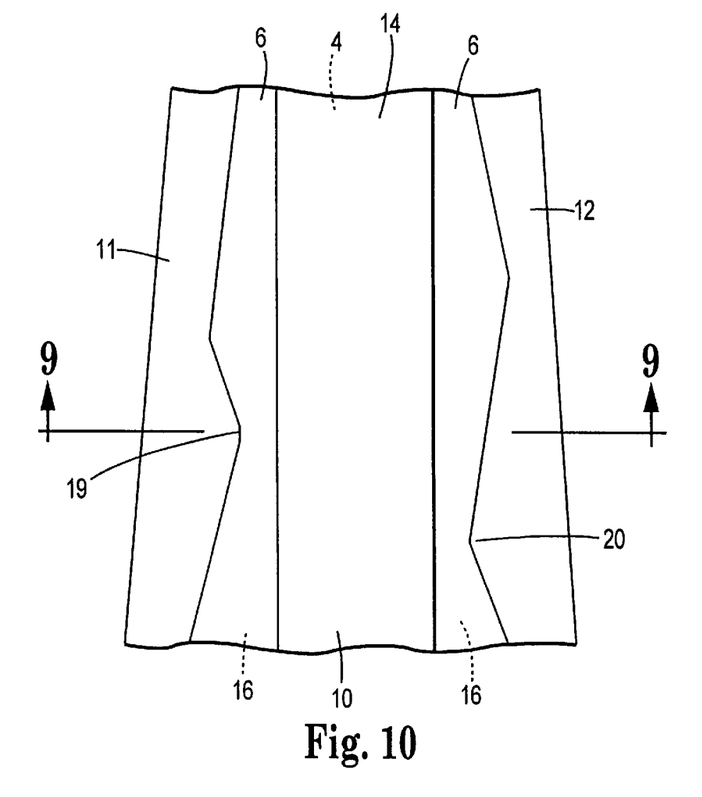
FIG. 10 is a partial top view of a roof-ditch channel comprising an on-line painted insert 1 according to FIG. 9 with the release liners 18 being removed, said top view thus exposing the color of the outer parts 16 of the bottom area 7 in the gap 6 between the roof panel 11 and the side panel 12.

In the embodiment of FIG. 9 the outer parts 16 of the bottom area 7 of the body 3 were covered with a release liner 18 prior the painting cycle. Removing the release liner after the painting step results in exposing the outer parts 16 of the bottom area 7 and its color, and the corresponding top view of a roof-ditch channel comprising an insert according to FIG. 9, is shown in FIG. 10.

The method of mounting the insert 1 into the depression 2 is easy and highly reliable. In a first step the adhesive layer 5 is applied to the bottom of the depression 2. Depending on the nature of the adhesive it may be pumped into the depression 2 as, for example, in the case of plastisol adhesives or it may be inserted as a solid, optionally die-cut layer optionally essentially conformed to the shape of the depression 2.

In the next step the body 3 is mechanically inserted into the depression 2, applying appropriate pressure, for example, by hand or by using a pressure roll. The body 3 is pressed into the depression 2 until it contacts the adhesive layer 5.

In the next step the insert 1 positioned in the depression 2 is subjected to the painting cycle. The painting cycle preferably is an on-line painting process resulting in painting of the insert 1 and the adjacent surface bordering the depression. The paint may be applied by various techniques such as, for example, dip coating, spray coating, powder coating or electrostatic coating with electrostatic and powder coating being preferred. The temperature-time profile applied during the painting cycle may vary depending mainly on the painting technique and the paint used. In the automotive industry electrostatic coating presently is the dominantly used technology. A typical painting cycle includes two or more painting steps each followed by a drying step at a temperature of between 160–180° C. for about 30 minutes.

Alternatively, the adhesive layer 5 can be applied first to the body 3, and the resulting assembly can then be inserted into the depression 2 followed by the painting cycle.

The present invention provides an easily applicable, self-centering, tolerances managing on-line paintable insert which is useful for various applications and, in particular, for automotive applications. The insert is essentially suited for being mounted into the roof-ditch channels of automobiles.

The present invention will be further explained in the following examples which explain the invention without limiting it.

TEST METHODS

Taber Stiffness Test

The materials useful for preparing the bottom area 7 and, in particular, the outer parts 16 of the bottom area 7 of the body 3 are selected by using the Taber stiffness test in order to evaluate their deformability. The Taber stiffness test was performed according to TAPPI T 489-M60 using a deflection angle of 15°. The stiffness is reported in Taber stiffness units (g.cm).

EXAMPLES

Example 1

A roof-ditch channel was simulated by bending two stainless steel sheets (length 100 cm, width 7 cm, thickness 0.8 mm) to provide a trough-shaped depression with an essentially rectangular cross-section when positioned in an overlapping mode as shown, for example, in FIG. 4. The two metal sheets were spot-welded at the junction of the two stainless steel sheets at intervals of 80 mm. The simulated roof ditch channel had a length of about 1 m, a minimum lateral extension as measured at the bottom of the roof-ditch channel of 14±2 mm, and a depth as measured along the spot welded junction of 6±0.5 mm.

A layer of Structural Sealing Tape 5222 commercially available from 3M Company, St. Paul, Minn., U.S.A. having the dimensions 100 cm×8 mm×0.05 mm was placed in the bottom of the roof ditch channel.

An essentially anvil-shaped profile as shown in FIG. 4 having a bottom width of 12.5 mm, a top width of 8 mm, a height of 5 mm, and a length of 100 mm was obtained by extrusion of POCAN 7916, which is commercially available from Bayer AG, Germany. The outer parts 16 of the bottom layer 7 had a thickness of about 250 $\mu$m and a width of about 2 mm. The extruded profile was then forced into the simulated roof-ditch channel using hand pressure. The gap formed between the paintable surface and the edges of the simulated roof-ditch channel was 3±1 mm.

The simulated roof-ditch channel with the inserted body was subjected to a first painting step (application of a primer) followed by a first drying step (180° C., 30 min.), and then to a second painting step (finish coating) and a second drying step (180° C., 30 min.).

After painting, the resulting painted roof ditch was examined by visual inspection. The body was well centered in the middle of the roof-ditch. Paint adhered to the roof-ditch edges and the outer surfaces simulating the roof panel and the side panel, to the exposed paintable surface of the body, and to the bottom of the roof-ditch channel as schematically indicated in FIG. 4. The exposed paintable surface was painted evenly and there was no bridging in the gap 6 between the paintable surface of the body 3 and the edges of the roof-ditch channel 10. No indentations reflecting the location of the spot welds were visible on the paintable surface 4 which was uniformly and evenly painted along its entire length.

Example 2

A simulated roof-ditch channel was prepared according to the method described in Example 1. The simulated roof-ditch channel used in Example 2 had a length of approximately 1 m, a minimum lateral extension as measured at the bottom of the roof-ditch channel of 14±2 mm, and a height as measured along the spot-welded seam of 6±0.5 mm.

A strip of aluminum sheet with a rectangular cross-section was prepared having a length of 1 m, a width of 8 mm, and a thickness of 4 mm. The aluminum strip was bonded with Structural Bonding Tape 9214 commercially available from 3M Company, St. Paul, Minn., U.S.A., to a POCAN 7916 strip with a rectangular cross-section having a length of 100 cm, a thickness of about 250 $\mu$m, and a width of 12.5 mm, whereby the aluminum strip was centered on top of the POCAN 7916 strip so that equal portions of the POCAN 7916 strip extended on both sides of the aluminum strip as is shown in FIG. 6.

A layer of Structural Sealing Tape 5222, commercially available from 3M Company, St. Paul, Minn., U.S.A., having the dimensions 100 cm×12 mm×1 mm was placed on the bottom of the roof-ditch channel.

The body 3 comprising the aluminum strip with the POCAN 7916 strip being adhered to it, was subsequently forced into the simulated roof-ditch channel 10 using hand pressure. The simulated roof-ditch channel with the inserted body 3 was subjected to a first painting step (application of a primer) followed by a first drying step (180° C., 30 min.), followed by a second painting step (finish coating) and a second drying step (180° C., 30 min.).

After painting, the resulting painted roof ditch 10 was examined by visual inspection. The body 3 was well centered in the middle of the roof-ditch channel. Paint adhered to the roof-ditch edges and the outer surfaces simulating the roof panel and the side panel, to the exposed paintable surface 4 of the body 3, and to the bottom of the roof-ditch channel 10 as schematically indicated in FIG. 4. The exposed paintable surface 4 was painted evenly and there was no bridging in the gap 6 between the paintable surface 4 of the body and the edges of the roof-ditch channel 10. No indentations reflecting the locating of the spot welds were visible on the paintable surface 4 which was uniformly and evenly painted along its entire length.

Example 3

POCAN 7916 strips were extruded having a length of 2¾ inch, a width of 1½ inch, and various thicknesses as indicated below. The Taber stiffness was measured according to the test method described above, and the following results were obtained.

| Thickness of POCAN strip (μm) | Taber Stiffness (g · cm) |
|---|---|
| 80 | 1.0 |
| 150 | 7.5 |
| 309 | 45.0 |
| 475 | >100 |

It will be apparent to those skilled in the art that various modifications are possible within the scope of the foregoing description and drawings without departing from the invention which is defined by the accompanying claims.

What is claimed is:

1. An on-line paintable insert useful for mounting into a depression having a lateral, a longitudinal and a vertical extension, said insert comprising an optionally shaped body having a paintable surface and being attachable to the depression by an adhesive layer, wherein:
   (a) a lateral extension of a bottom area of the body is essentially equal to or exceeds the minimum lateral extension of the depression over the longitudinal extension of the depression, the body being deformable at least in outer parts of the bottom area to allow for essentially self-centering and friction-fitting mounting of the insert into the depression;
   (b) a lateral extension of an upper area of the body is less than the lateral extension of the depression at the vertical position of the upper area of the body when being mounted into the depression over the longitudinal extension of the depression, which results in a gap between the upper area including the paintable surface, and the depression; and
   (c) the insert is essentially dimensionally stable when subjected to a painting cycle.

2. An insert according to claim 1 wherein the material, the shape and the dimension of the outer parts of the bottom area of the body are selected so as to impart to the outer parts a Taber stiffness as measured according to TAPPI T 489-M60 of between 5 and 50 g.cm.

3. An insert according to claim 1 wherein the material, the shape and the dimension of the outer parts of the bottom area of the body are selected to allow for forcing the insert into the depression by positioning the insert onto the depression and rolling it over twice with a rubber roll of 5 kg or less.

4. An insert according to claim 1 wherein the ratio of the longitudinal extension of the depression over its lateral extension is at least 5.

5. An insert according to claim 1 wherein the areas of the body other than the bottom area comprise materials which are selected from the group consisting of aluminum, optionally coated steel, copper, brass and plastic.

6. An insert according to claim 5 wherein the area of the body other than the bottom area additionally comprises a stiffening inlay.

7. An insert according to claim 6 wherein the material, the shape and the dimension of the outer parts of the bottom area of the body are selected so as to impart to the outer parts a Taber stiffness as measured according to TAPPI T 489-M60 of between 5 and 50 g.cm.

8. An insert according to claim 7 wherein the ratio of the longitudinal extension of the depression over its lateral extension is at least 5.

9. An insert according to claim 1 wherein the deformable area and the other areas of the body comprise the same materials.

10. An insert according to claim 1 wherein the body is a molding.

11. An insert according to claim 1 wherein the adhesive of the adhesive layer is selected from the group consisting of thermosettable adhesives, hot-melt adhesives and pumpable plastisol adhesives.

12. An insert according to claim 11 wherein the material, the shape and the dimension of the outer parts of the bottom area of the body are selected so as to impart to the outer parts a Taber stiffness as measured according to TAPPI T 489-M60 of between 5 and 50 g.cm.

13. An insert according to claim 12 wherein the area of the body other than the bottom area additionally comprises a stiffening inlay.

14. An insert according to claim 13 wherein the ratio of the longitudinal extension of the depression over its lateral extension is at least 5.

15. An insert according to claim 1 wherein the adhesive layer comprises a melt-flowable adhesive forming a sealant layer.

16. An insert according to claim 15 wherein the material, the shape and the dimension of the outer parts of the bottom area of the body are selected so as to impart to the outer parts a Taber stiffness as measured according to TAPPI T 489-M60 of between 5 and 50 g.cm.

17. An insert according to claim 16 wherein the area of the body other than the bottom area additionally comprises a stiffening inlay.

18. An insert according to claim 17 wherein the ratio of the longitudinal extension of the depression over its lateral extension is at least 5.

19. An insert according to claim 1, wherein said insert is suitable for forming part of an automobile.

20. An insert according to claim 1, wherein said insert is an on-line paintable insert for roof-ditch channels.

* * * * *